US009852660B1

(12) United States Patent
Fairbanks

(10) Patent No.: US 9,852,660 B1
(45) Date of Patent: Dec. 26, 2017

(54) CATHETERIZATION PROCEDURE TRAINING APPARATUS

(71) Applicant: Robert Fairbanks, Spring Hill, FL (US)

(72) Inventor: Robert Fairbanks, Spring Hill, FL (US)

(*) Notice: Subject to any disclaimer, the term of this patent is extended or adjusted under 35 U.S.C. 154(b) by 235 days.

(21) Appl. No.: 14/958,845

(22) Filed: Dec. 3, 2015

(51) Int. Cl.
*G09B 23/28* (2006.01)
*G09B 23/30* (2006.01)
*G09B 23/34* (2006.01)

(52) U.S. Cl.
CPC ........... *G09B 23/303* (2013.01); *G09B 23/34* (2013.01)

(58) Field of Classification Search
USPC .................................. 434/262, 267, 268, 272
See application file for complete search history.

(56) References Cited

U.S. PATENT DOCUMENTS

| | | | | | |
|---|---|---|---|---|---|
| 3,579,858 | A | * | 5/1971 | Bentov | G09B 23/32 434/272 |
| 5,679,005 | A | * | 10/1997 | Einstein | G09B 23/28 434/267 |
| 6,062,866 | A | * | 5/2000 | Prom | G09B 23/28 434/262 |
| 6,511,325 | B1 | * | 1/2003 | Lalka | A61B 8/587 434/267 |
| 8,632,343 | B2 | * | 1/2014 | Blackburn | G09B 23/285 434/267 |
| 8,808,004 | B2 | * | 8/2014 | Misawa | G09B 23/30 434/268 |
| 8,834,172 | B2 | * | 9/2014 | Rubinstein | G09B 23/285 434/262 |
| 2007/0269784 | A1 | * | 11/2007 | LaFrance | G09B 23/285 434/272 |
| 2009/0246747 | A1 | * | 10/2009 | Buckman, Jr. | G09B 23/285 434/272 |
| 2013/0288218 | A1 | * | 10/2013 | Mallin | G09B 23/303 434/268 |
| 2014/0272873 | A1 | * | 9/2014 | Svensson | G09B 23/34 434/268 |
| 2016/0148541 | A1 | * | 5/2016 | Ristolainen | G09B 23/285 434/268 |

* cited by examiner

*Primary Examiner* — Kurt Fernstrom
(74) *Attorney, Agent, or Firm* — Gulf Coast Intellectual Property Group

(57) ABSTRACT

A catheterization procedure training apparatus operable to provide a user training on the delivery of a catheterization process wherein the apparatus further allows the utilization of interventional devices. The catheterization procedure training apparatus includes a tubing network being hollow and fluidly coupled wherein the tubing network is configured to be sized and shaped so as to physically be proportionally representative of at least a portion of the blood vessels within a human circulatory system. A ventricle chamber is operably coupled to the tubing network. The tubing network further includes at least one opening having a union wherein the union is configured to be operably coupled to an exchangeable insertion point adapter. The exchangeable insertion point adapter includes a stem portion and a wall portion integrally formed and is configured to provide repetitive sealable use of a needle therethrough.

20 Claims, 2 Drawing Sheets

CATHETERIZATION PROCEDURE TRAINING APPARATUS

PRIORITY UNDER 35 U.S.C. SECTION 119(e) & 37 C.F.R. SECTION 1.78

This nonprovisional application claims priority based upon the following prior United States Provisional Patent Application entitled: Catheterization Simulator, Application No. 62/093,334 filed Dec. 17, 2014, in the name of Robert Fairbanks, which is hereby incorporated by reference for all purposes

FIELD OF THE INVENTION

The present invention relates generally to medical procedure training devices, more specifically but not by way of limitation, a training apparatus operable to provide a structure and a training procedure to assist in the skill development of executing cardiac catheterization procedures.

BACKGROUND

Cardiac catheterization procedures are utilized on a frequent basis as a diagnostic procedure to evaluate a patient's coronary condition. As is known in the art, cardiac catheterization is an invasive procedure that is utilized to confirm the presence of heart disease such as but not limited to coronary artery disease and if required determine the need for further treatment thereof. It is further common during the catheterization procedure to perform interventional or therapeutic procedures at the end of the diagnostic portion of a catheterization procedure. Interventional procedures include but are not limited to balloon angioplasty and stent placements.

While the cardiac catheterization procedure is generally safe, there are risks to which the patient is exposed. During the procedure the patient is exposed to some of the following risks: perforation of blood vessel, allergic reaction to dye and bleeding proximate the puncture point. While the cardiac catheterization procedure is executed in a hospital or similar environment, the aforementioned risks and others are still a possibility for the patients. Reducing these risks for the patients is important not only for the health of the patient but for the practitioner delivering the procedure.

One issue with the delivery of cardiac catheterization procedures are the numerous types catheters and catheter procedures that are utilized. By way of example but not limitation, a typical practitioner will deliver catheterization procedures that include balloon pumps, impellas and rotoblades and other devices that can execute interventional procedures. The iterations/embodiments of the tools utilized for cardiac catheterization procedures are numerous. The quantity of the available embodiments ultimately requires that a practitioner be familiar with and trained on each and every type in order to successfully deliver the cardiac catheterization procedure. Executing procedures with intermittent exposure to the various types of catheters has shown to result in an increase of complications during the delivery of the procedure.

Accordingly, it is desirable that a cardiac catheterization training apparatus be provided so as to provide an apparatus that is operable to facilitate the training of practitioners on the numerous types of catheters and the procedures/techniques associated therewith.

SUMMARY OF THE INVENTION

It is the object of the present invention to provide a cardiac catheterization training apparatus that is operable to provide elements that provide an environment for a user so as to simulate the execution procedure of the delivery of a cardiac catheterization.

Another object of the present invention is to provide a cardiac catheterization training apparatus that is encased in a housing wherein the housing is constructed to resemble that of a human torso.

A further object of the present invention is to provide a cardiac catheterization training apparatus that includes a plurality of insertion points wherein at least one of the plurality insertion points is operable to replicate the femoral artery.

An additional object of the present invention is to provide a cardiac catheterization training apparatus operable to provide an environment to train a practitioner on the delivery of a cardiac catheterization procedure wherein the plurality of insertion points are exchangeable.

Yet a further object of the present invention is to provide a cardiac catheterization training apparatus that is operable to facilitate the training the execution of a cardiac catheterization procedure wherein the plurality of insertion points are operable to accommodate catheters in a plurality of sizes, more specifically but not by way of limitation, 4 French to 14 French sized catheters.

Still another object of the present invention is to provide a cardiac catheterization training apparatus that includes an aorta replica that is operably coupled to the exchangeable insertion point.

A further object of the present invention is to provide a cardiac catheterization training apparatus operable to provide an environment to train a practitioner on the delivery of a cardiac catheterization procedure that further includes a left ventricle member operably coupled to the aorta replica.

An added object of the present invention is to provide a cardiac catheterization training apparatus that further includes left coronary artery replica members and right coronary artery replica members wherein the left coronary replica members and right coronary artery members are operably coupled to the left ventricle replica member.

An alternative object of the present invention is to provide a cardiac catheterization training apparatus that includes an exit port formed with the left ventricle replica member.

A further object of the present invention is to provide a cardiac catheterization training apparatus that incorporates a closed fluid loop system that is filled with a suitable fluid such as but not limited to a saline solution.

Yet another object of the present invention is to provide a cardiac catheterization training apparatus that is operable to provide an environment to train a practitioner on the delivery of a cardiac catheterization that further incorporates barium or similar material during the training procedure in order to facilitate the ability to use x-rays to measure the success of the simulated procedure.

Still another object of the present invention is to provide a cardiac catheterization training apparatus that includes a disease simulation member disposed within the left coronary artery replica member and/or right coronary artery replica member.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the present invention.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
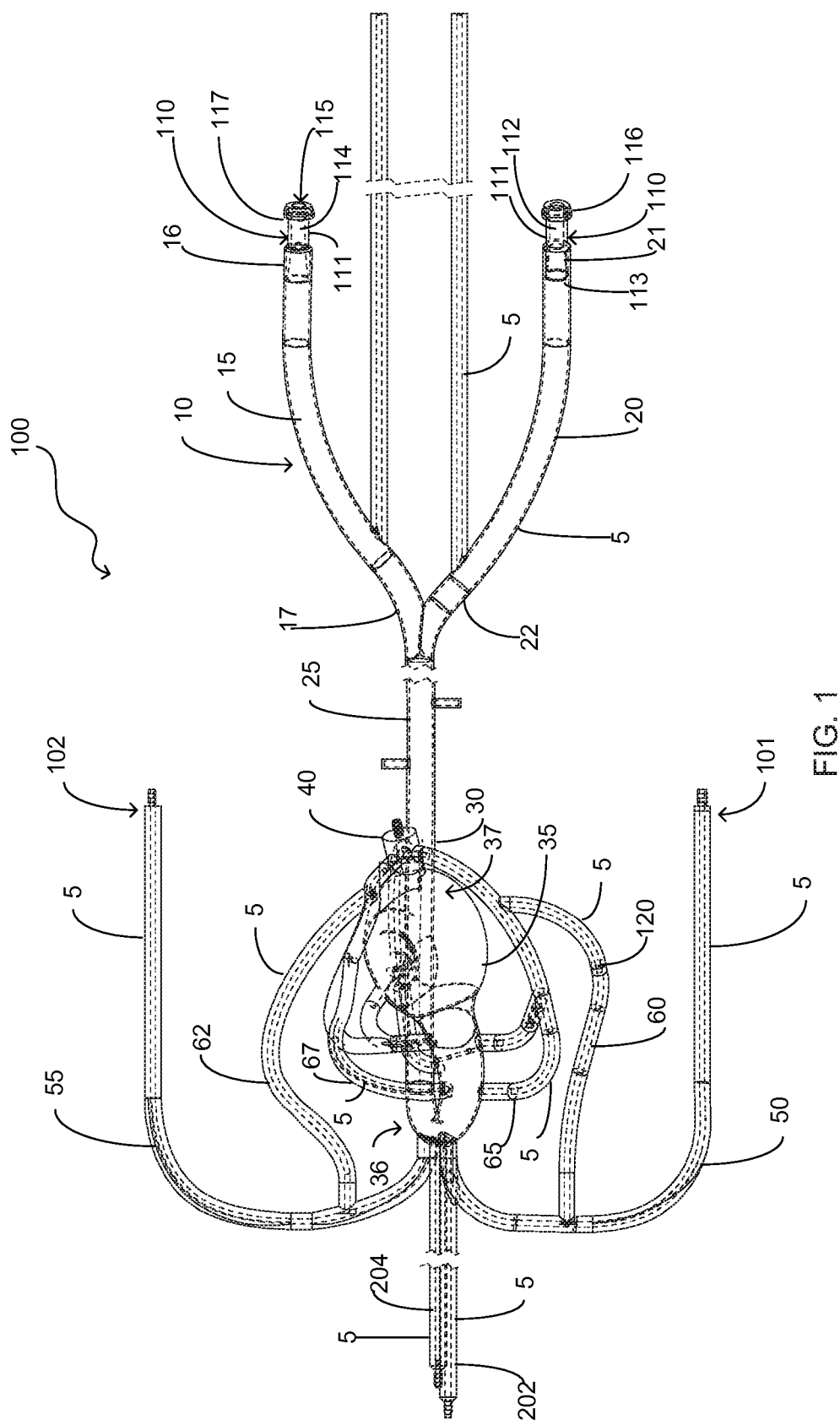
FIG. 1 is a diagrammatic view of the present invention.

Referring now to the drawings submitted herewith, wherein various elements depicted therein are not necessarily drawn to scale and wherein through the views and figures like elements are referenced with identical reference numerals, there is illustrated a catheterization procedure training apparatus 100 constructed according to the principles of the present invention.

Illustrated herein in FIG. 1, the tubing network 10 of the catheterization procedure training apparatus 100 is shown. The tubing network 10 comprises a plurality of tubes 5 being operably coupled and configured so as to provide simulation of blood vessels of the human circulatory system. The tubes 5 are manufactured from a suitable durable material such as but not limited to plastic and are sized in various diameters so as to provide replication of the diameters, size and shape of the circulatory blood vessel that is being simulated. All tubes 5 are hollow having a passage therethrough so as to facilitate the accommodation of a fluid such as but limited to saline.

The tubing network 10 includes a left femoral arterial tube 15 having a first end 16 and second end 17. A right femoral arterial tube 20 is opposite the left femoral arterial tube 15 and includes first end 21 and second end 22. The left femoral arterial tube 15 and right femoral arterial tube 20 are fluidly coupled to the abdominal arterial tube 25 proximate second ends 17, 22. The first ends 16, 21 of the left femoral arterial tube 15 and right femoral arterial tube 20 respectively are configured to operably couple with the exchangeable insertion point adapter 90 as further discussed herein. The exchangeable insertion point adapter 90 provides an entry point into the tubing network 10 so as to facilitate the utilization of a conventional catheter and associated interventional devices within the catheterization procedure training apparatus 100. The first ends 16, 21 are illustrated herein with union 110. Union 110 is configured to mateably engage with the exchangeable insertion point adapter 90. Union 110 includes a body 111 that is cylindrical in shape being configured to be inserted into first ends 16, 21. The body 111 includes a first end 112 and a second end 113 with a hollow passage 114 extending intermediate therebetween. Union 110 includes opening 115 providing access to the hollow passage 114. Integrally secured with the first end 112 is coupling 116 which includes lip 117 wherein the lip 117 is formed to have a diameter that is greater than that of the body 111. While not particularly illustrated herein, the lip 117 further includes a recessed area on the underside thereof configured to assist in releasable securing of the exchangeable insertion point adapter 90 thereto. While a union 110 has only been illustrated herein being coupled to first ends 16 and 21, it should be noted that the union 110 is present and secured additionally to each of the following ends 101 an 102.

The abdominal arterial tube 25 is contiguous with the descending thoracic aorta tube 30 which is operably coupled the ventricle chamber 35. The ventricle chamber 35 includes a first end 36 and second 37 and is constructed so as to provide a replica of the left ventricle of the human heart. The ventricle chamber 35 is manufactured from a suitable durable material such as but not limited to silicone rubber or other pliable material. An exit port 40 is operably coupled to second end 37 of the ventricle chamber 35 and is configured to provide a means to evacuate and/or fill the tubing network 10 with a suitable liquid. While not illustrated herein it is contemplated within the scope of the present invention that the exit port 40 could be operably coupled to a conventional pump so as to provide a means of pressurizing the tubing network 10 to a pressure that would simulate the blood pressure within the human circulatory system. While the catheterization procedure training apparatus 100 has illustrated herein a ventricle chamber 35 that is operable to provide a replica of the left ventricle of the human heart, it is contemplated within the scope of the present invention that the catheterization procedure training apparatus 100 could include a replica of the human heart having all four chambers so as to provide techniques for training on alternate procedures such as but not limited to pacemaker installation procedures. Additionally, it is contemplated within the scope of the present invention that the catheterization procedure training apparatus 100 could include an additional pump operably coupled to ventricle chamber 35 and be configured to provide a simulated pumping movement thereof.

Still referring to FIG. 1 herein, the tubing network 10 includes a right subclavian arterial tube 50, a left subclavian arterial tube 55, bypass arterial tubes 60,62 and saphenous vein graft tubes 65,67. All of the immediately aforementioned tubes 5 are fluidly coupled and manufactured so as to simulate the associated circulatory blood vessel similarly named. It should be understood to those of ordinary skill in the art that the immediately aforementioned tubes 5 are operably coupled identically to their represented circulatory blood vessel elements of the human circulatory system. While various circulatory blood vessels are simulated within the catheterization procedure training apparatus 100, it is contemplated within the scope of the present invention that the catheterization procedure training apparatus 100 could include additional circulatory blood vessel elements or fewer circulatory blood vessel elements.

Disposed within the tubes 5 are disease simulation elements 120. The disease simulation elements 120 are releasably secured to the internal wall of the tubes 5 and extend inward and are operable to provide representation of conventional conditions such as but not limited to plaque buildup. It is contemplated within the scope of the present invention that the disease simulation elements 120 are configured to be replaceable so as to facilitate their utilization in a training procedure. By way of example but not limitation, a disease simulation element 120 could be manufactured from an elastomer configured to be compressed such that a user of the catheterization procedure training apparatus 100 could engage in the use of a catheter having an angioplasty balloon in order to practice the utilization thereof. It is contemplated within the scope of the present invention that the disease simulation elements 120 could be manufactured of various different materials and be constructed in numerous different shapes in order to simulate various circulatory diseases typically found within blood vessels.

Figure 2:
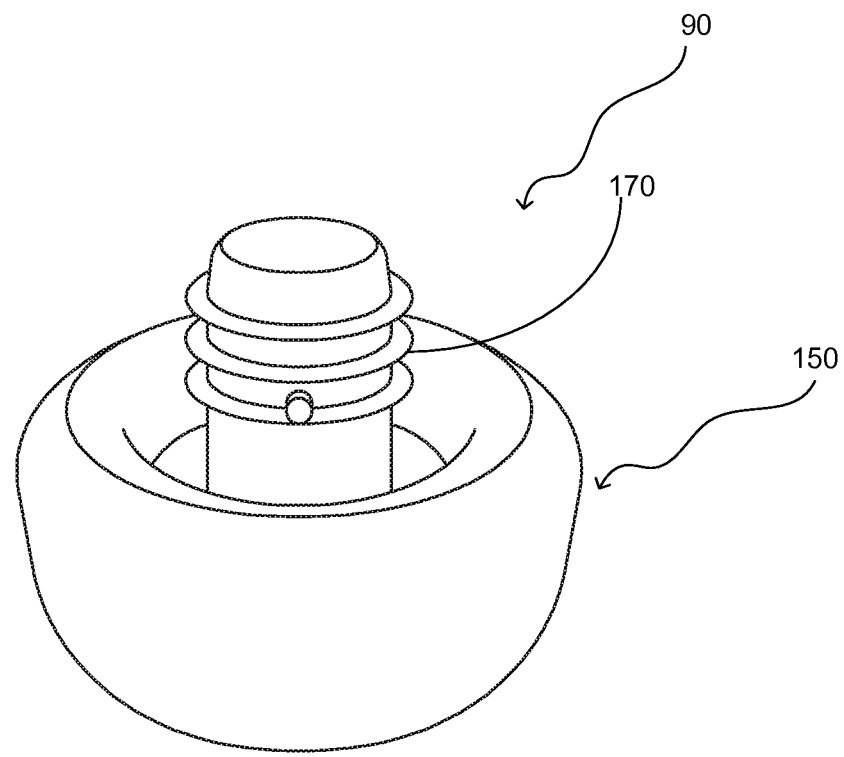
FIG. 2 is a perspective view of the exchangeable insertion point of the present invention.
Figure 3:
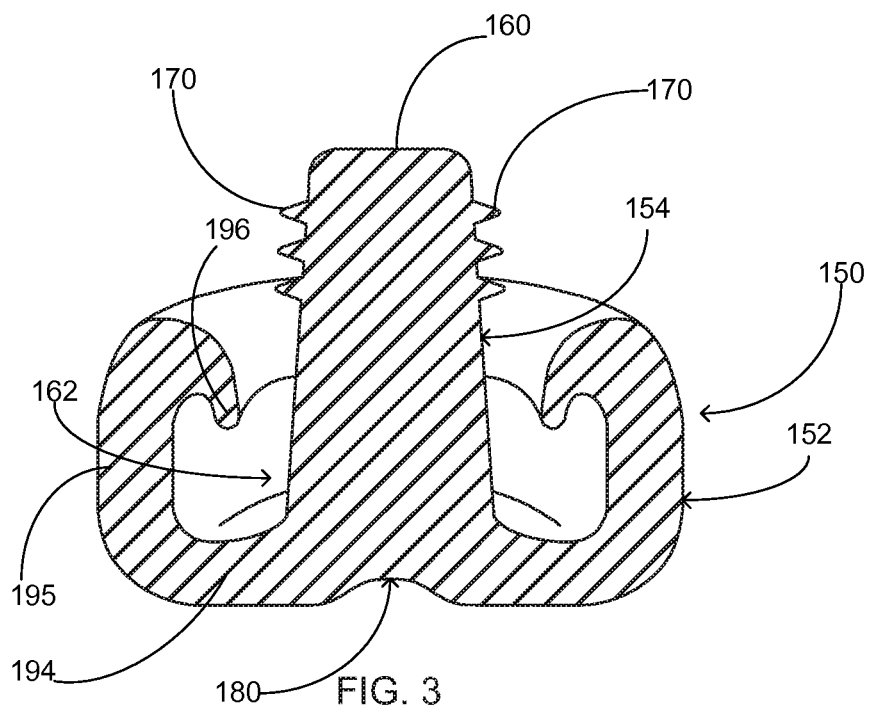
FIG. 3 is a cross-sectional view of the exchangeable insertion point of the present invention.

Illustrated herein in FIGS. 2 and 3, is the exchangeable insertion point adapter 90. The exchangeable insertion point adapter 90 is operable to be releasably secured to the union 110. The exchangeable insertion point adapter 90 includes a body 150 having a first portion 152 and a stem portion 154 integrally formed. The body 150 is manufactured from a platinum-based cured silicon, also known in the art as addition curing system. It is desirable within the scope of the present invention that the body 150 is manufactured from the aforementioned material due to its feedback and sealing properties provided to a user during utilization of the catheterization procedure training apparatus 100 as further discussed herein. The stem portion 154 is slightly tapered in shape and includes first end 160 and second end 162. The first end 160 further includes a plurality of ribs 170 projecting therefrom. The ribs 170 are vertically oriented and planar in manner and circumferentially surround the stem portion 154 proximate the first end 160. Ribs 170 function to provide a technique to enhance the ability for the first end 160 of the stem portion 154 to be secured within the hollow passage 114 of the union 110 subsequent the exchangeable insertion point adapter 90 being coupled thereto. While three ribs 170 are illustrated herein, it is contemplated within the scope of the present invention that stem portion 154 could have as few as one rib 170 or greater than three ribs 170. Additionally it is contemplated within the scope of the present invention that the stem portion 154 could be configured with alternate securing elements so as to facilitate the securing of the first end 160 within hollow passage 114.

The stem portion 154 is solid as shown in FIG. 3 herein and further is in axial alignment with depression 180. Depression 180 provides a guide location for a user of the catheterization procedure training apparatus 100 to insert the needle during the beginning procedural step of utilizing a conventional catheter. During a training procedure a user will insert a needle entirely through the stem portion 154 and subsequently insert the wire through the needle, remove the needle, insert a sheath over the wire and ensuingly remove the wire. The aforementioned steps are commonly known in the art of utilizing a catheter. As previously mentioned herein, the material utilized to manufacture the body 150 is desired as subsequent the removal of the sheath that the stem portion 154 will seal so as to facilitate the re-use thereof. This allows users of the catheterization procedure training apparatus 100 to utilize the exchangeable insertion point adapter 90 numerous times prior to replacement.

Shown in particular in FIG. 3 the first portion 152 includes a top portion 194 and a wall 195. The wall 195 is integrally formed with the top portion 194 and is distal to the stem portion 154. Wall 195 includes an upper section 196 that is curved in formation and extending inward towards top portion 194. The aforementioned shape of the upper section 196 of the wall 195 provides sealable engagement with lip 117 of the union 110 so as to inhibit the leaking of any fluid therefrom. It is contemplated within the scope of the present invention that the wall 195 could be formed in various shapes so as to provide a sealable connection with union 110.

While not illustrated herein it is contemplated within the scope of the present invention that the catheterization procedure training apparatus 100 could further include modular simulation elements such as but not limited to a human head simulation element. Carotid tube 202,204 have been provided as part of the catheterization procedure training apparatus 100 in order to facilitate the fluid coupling of such an exemplary module. Those skilled in the art will recognize that the catheterization procedure training apparatus 100 could further include additional exemplary modular simulation elements. It should be further noted that the catheterization procedure training apparatus 100 could include a tubing network 10 that includes representation of a portion of all of the venal portion of the human circulatory system in addition to the arterial portion.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A catheterization procedure training apparatus comprising:
    a tubing network, said tubing network including a plurality of tubes, said plurality of tubes configured to simulate at least a portion of the blood vessels within a human circulatory system, said plurality of tubes being fluidly coupled, said tubing network further including at least one opening;
    a chamber, said chamber configured to simulate a left ventricle of a human heart, said chamber having a first end and a second end, said chamber being fluidly coupled with said tubing network;
    a union, said union being operably secured to said at least one opening of said tubing network, said union being cylindrical in shape have a first end and a second end, said union having a hollow passage extending therethrough;
    an exchangeable insertion point adapter, said exchangeable insertion point adapter being operably secured to said union, said exchangeable insertion point adapter having a stem portion, said stem portion formed so as to be at least partially inserted into the hollow passage of said union, said stem portion having a first end and a second end.

2. The catheterization procedure training apparatus as recited in claim 1, wherein said exchangeable insertion point adapter further includes a top portion and a wall portion integrally formed with the stem portion.

3. The catheterization procedure training apparatus as recited in claim 2, wherein said stem portion further includes at least one fastener projecting therefrom proximate said first end of the stem portion.

4. The catheterization procedure training apparatus as recited in claim 3, wherein the chamber further includes an exit port, said exit port operably coupled to the second end of said chamber, said exit port configured to evacuate or fill the tubing network with fluid.

5. The catheterization procedure training apparatus as recited in claim 4, wherein said union further includes a coupling, said coupling extending outward from said at least one opening subsequent said union being secured within said at least one opening.

6. The catheterization procedure training apparatus as recited in claim 5, wherein the wall portion of the exchangeable insertion point adapter further includes an upper section configured to mateably engage with the coupling of the union.

7. The catheterization procedure training apparatus as recited in claim 6, wherein said exchangeable insertion point adapter is manufactured from a platinum-based cured silicon.

8. A catheterization procedure training apparatus that is operable to facilitate the execution of catheterization training wherein the training is inclusive of interventional devices comprising:
- a tubing network, said tubing network including a plurality of tubes, said plurality of tubes configured and formed to simulate the size and shape of at least a portion of the blood vessels within a human circulatory system, said plurality of tubes being fluidly coupled, said tubing network further including at plurality of openings;
- a chamber, said chamber configured to simulate a human heart, said chamber having a first end and a second end, said chamber being fluidly coupled with said tubing network, said chamber further having an exit port formed in the second end thereof;
- a union, said union being operably secured to said at least one opening of said tubing network, said union being cylindrical in shape have a first end and a second end, said union having an opening at said first end and said second end, said union having a hollow passage extending therethrough, said union further including a coupling formed on the second end thereof;
- an exchangeable insertion point adapter, said exchangeable insertion point adapter being operably secured to said union, said exchangeable insertion point adapter having body, said body of the exchangeable insertion point adapter further including a stem portion, said stem portion having a first end and a second end, said stem portion being tapered in shape, said body of the exchangeable insertion point adapter further including a top portion and a wall portion being integrally formed with said stem portion, said top portion being proximate said second end of said stem portion, said stem portion being longitudinally central within the exchangeable insertion point adapter.

9. The catheterization procedure training apparatus as recited in claim 8, wherein said wall portion of said exchangeable insertion point adapter is integrally formed with said top portion, said wall portion being distal to said stem portion, said wall portion extending outward from said top portion being generally parallel with said stem portion.

10. The catheterization procedure training apparatus as recited in claim 9, wherein said coupling of said union further includes a lip, said lip being circumferentially formed around said coupling.

11. The catheterization procedure training apparatus as recited in claim 10, wherein said stem portion further includes a plurality of ribs, said plurality of ribs extending outward therefrom, said plurality of ribs being proximate said first end, said plurality of ribs operable to provide securing of the stem portion within the hollow passage of the union.

12. The catheterization procedure training apparatus as recited in claim 11, and further including at least one disease simulation element, said at least one disease simulation element disposed within said tubing network, said disease simulation element operable to simulate a circulatory disease.

13. The catheterization procedure training apparatus as recited in claim 12, wherein the wall portion of the exchangeable insertion point adapter includes an upper section, said upper section of said wall portion being curved in shape so as to engage with said lip of said coupling.

14. The catheterization procedure training apparatus as recited in claim 13, wherein said exchangeable insertion point adapter is manufactured from a platinum-based cured silicon.

15. A fluid-filled catheterization procedure training apparatus that is operable to facilitate the execution of catheterization training wherein the training is inclusive of interventional devices comprising:
- a tubing network, said tubing network including a plurality of tubes, said plurality of tubes configured and formed to simulate the size and shape of at least a portion of the arterial blood vessels within a human circulatory system, said plurality of tubes being fluidly coupled, said tubing network further including at plurality of openings;
- a chamber, said chamber configured to simulate a left ventricle of a human heart, said chamber having a first end and a second end, said chamber being fluidly coupled with said tubing network, said chamber further having an exit port formed in the second end thereof;
- a union, said union being operably secured to said at least one opening of said tubing network, said union being cylindrical in shape have a first end and a second end, said union having an opening at said first end and said second end, said union having a hollow passage extending therethrough, said union further including a coupling formed on the second end thereof, said coupling of said union further including a lip, said lip being circumferentially formed around said coupling;
- an exchangeable insertion point adapter, said exchangeable insertion point adapter being operably secured to said union, said exchangeable insertion point adapter having body, said body of the exchangeable insertion point adapter further including a stem portion, said stem portion having a first end and a second end, said stem portion being tapered in shape, stem portion further includes a plurality of ribs, said plurality of ribs extending outward therefrom, said plurality of ribs being proximate said first end, said plurality of ribs operable to provide securing of the stem portion within the hollow passage of the union, said body of the exchangeable insertion point adapter further including a top portion and a wall portion being integrally formed with the second end of said stem portion, said top portion being proximate said second end of said stem portion, said stem portion being longitudinally central within the exchangeable insertion point adapter.

16. The fluid-filled catheterization procedure training apparatus as recited in claim 15, wherein said top portion further includes a depression, said depression being axially aligned with said stem portion, said depression providing a guiding location for insertion of a needle into the stem portion.

17. The fluid-filled catheterization procedure training apparatus as recited in claim 16, wherein the wall portion of the exchangeable insertion point adapter includes an upper section, said upper section being curved in shape so as to sealably engage the lip of said coupling.

18. The fluid-filled catheterization procedure training apparatus as recited in claim 17, wherein the tubing network includes tubes operable to provide femoral and radial insertion points for a catheter training exercise.

19. The fluid-filled catheterization procedure training apparatus as recited in claim 18, and further including at least one disease simulation element, said at least one disease simulation element disposed within said tubing network, said disease simulation element operable to simulate a circulatory disease.

20. The fluid-filled catheterization procedure training apparatus as recited in claim 19, wherein said exchangeable insertion point adapter is manufactured from a platinum-based cured silicon.

* * * * *